US 6,735,776 B1

United States Patent
Legate (10) Patent No.: US 6,735,776 B1
(45) Date of Patent: May 11, 2004

(54) MOTION PICTURE EDITING AND DISTRIBUTION

(76) Inventor: Kim R. Legate, 27631 Weston Dr., Valencia, CA (US) 91354

( * ) Notice: Subject to any disclaimer, the term of this patent is extended or adjusted under 35 U.S.C. 154(b) by 0 days.

(21) Appl. No.: 09/241,945

(22) Filed: Feb. 1, 1999

(51) Int. Cl.$^7$ ................................................. H04N 7/00
(52) U.S. Cl. ............................. 725/25; 725/19; 725/63
(58) Field of Search ............................... 348/722, 460, 348/476, 463, 464; 725/19, 1, 9, 14, 18, 20, 25, 28, 30, 31, 63, 64, 65, 66, 73; H04N 7/00

(56) References Cited

U.S. PATENT DOCUMENTS

| 3,848,082 A | 11/1974 | Summers |
| 3,900,887 A | 8/1975 | Soga et al. |
| 4,230,990 A | 10/1980 | Lert, Jr. et al. |
| 4,368,486 A | 1/1983 | Degoulet et al. |
| 4,805,020 A | 2/1989 | Greenberg |
| 4,807,031 A | 2/1989 | Broughton et al. |
| 4,846,693 A | 7/1989 | Baer |
| 4,855,827 A | 8/1989 | Best |
| 4,857,999 A | 8/1989 | Welsh |
| 4,931,871 A | 6/1990 | Kramer |
| 5,019,899 A | 5/1991 | Boles et al. |
| 5,063,493 A | 11/1991 | Shioiri et al. |
| 5,063,523 A | 11/1991 | Vrenjak |
| 5,099,319 A | 3/1992 | Esch et al. |
| 5,450,134 A | 9/1995 | Legate |
| 5,557,334 A | 9/1996 | Legate |
| 5,960,081 A * | 9/1999 | Vynne et al. |
| 6,169,877 B1 * | 1/2001 | Gulla |

FOREIGN PATENT DOCUMENTS

GB           2132812          *   7/1984

* cited by examiner

Primary Examiner—David E. Harvey
(74) Attorney, Agent, or Firm—Kramer Levin Naftalis & Frankel LLP; Gregor N. Neff (57) ABSTRACT

Motion picture distribution is performed by converting the motion pictures into digital video signals, combining the video signals with code elements or icons positioned in the active picture area of images formed by the video signals and sent via satellite to theaters or other receiving locations. The video signals are stored at the receiving locations and displayed repetitively to audiences by means of a projection television system. The coded areas in the pictures are used to transmit motion picture identification, theater authorization and other information which can be used to control the distribution and display of the motion pictures. Reports regarding playing of the motion picture are transmitted from each display site to the offices of the remote distributor. Motion pictures are edited by converting the film into video signals, inserting coded areas into the active picture areas of the video signals to provide time codes, edge codes and related information useful for editing. Preferably, edge codes are represented by coded areas recorded on the motion picture film itself, either prior either to or during filming of the motion picture.

19 Claims, 5 Drawing Sheets

MOTION PICTURE EDITING AND DISTRIBUTION

This invention relates to the editing and the distribution of motion pictures.

The distribution of motion pictures long has been plagued by significant problems. One is that in the usual distribution of motion pictures, the film is duplicated many times, and the film copies are distributed physically to various theaters around the country. This is an expensive, laborious, time-consuming task.

Accordingly, it is an object of the present invention to provide an improved motion picture distribution system and method in which the time and the costs required for distribution are reduced significantly.

Another problem in the distribution of motion pictures is that physical copies of the film easily can be misappropriated so that pirated copies often are distributed early in the commercial life of a motion picture, to the detriment of its owners and everyone in the legitimate distribution chain.

Accordingly, it is another object of the present invention to provide a motion picture distribution system and method in which the copying of the motion picture is much more difficult so that the opportunities for pirating the motion picture are reduced by a significant degree.

Another problem in the production of a motion picture is in its editing. The normal film editing process is relatively slow and expensive. Therefore, various systems have been proposed in the past for converting the film to video signals, and editing the film electronically.

One of the problems with electronic editing is that signals used in the editing process, such as SMPTE time codes and film edge codes, often become unavailable during the editing process.

Accordingly, it is another object of the invention to provide a system and method for editing motion picture films in which information used in editing is readily available and is not easily lost or corrupted.

In accordance with the present invention, the foregoing objects are met by the provision of a motion picture distribution system in which motion pictures are distributed in the form of digital video signals, rather than film. Preferably, the digital signals representing the motion picture are encrypted and transmitted to at least one satellite and broadcast to a number of theaters or other receiving locations which are authorized to receive the signals and display the motion picture. The signals are stored in digital storage media at each receiving location, and later are displayed for an audience, preferably by means of a projection television system with a large screen.

In accordance with the present invention, code-bearing coded information signal areas are inserted into the video signals forming the active picture areas and are transmitted with the motion picture signals. These information-bearing areas preferably are comprised of several lines of information recorded in the margins of the active picture area where they cannot be seen when the pictures are displayed. These coded areas contain information such as an identification of a motion picture, and identification of receiving locations authorized to receive and display the motion picture.

The coded areas or icons also can contain various other information useful in the controlling of the display of the films, such as the number of times the recipient is authorized to display the motion picture, the time during which display is permitted, the location of areas in which local ads are to be inserted, together with activating signals to activate local ad insertion equipment, and the identification of previews of coming attractions or other short topics specifically selected by the customer at the receiving location, and other information which enables the distributor of the motion picture to control its distribution and playing.

In addition, means are provided for transmitting back to the distributor the identification of each picture played, the number of times and times of day at which it has been played, the box office receipts for the display of the picture, concession returns, and other such commercial information, so that the compensation due the distributor can be determined.

In the editing of motion pictures in accordance with the present invention, the foregoing objectives are met by the conversion of motion picture film into video signals by means such as a telecine, and the insertion of the information-bearing areas or icons in the active picture areas of the video signals. The icons then are used in the electronic editing process. The information contained in the icons includes editing information such as SMPTE time codes, scene and "take" numbers, production information such as the "best take"; location of the shoot; camera number, and identity of the crew, and other information often noted by production assistants during the filming of the motion picture.

Edge codes preferably are recorded onto the motion picture film itself by recording such codes outside of the image areas of the film. This can be done either by the manufacturer of the film when it is being made, or by the motion picture camera during filming. Then, as a preliminary step to editing, the coded images recorded in the margins of the film are decoded, converted into video signals and inserted into the video signals produced by the telecine so as to be located in the periphery of the video pictures.

The information recorded in the coded area or icons then is read by a code reader and is utilized either by displaying it for editing operators to use in making their editing decisions, or in other ways to assist in editing.

When the motion picture has been edited electronically, the edited video signals are either stored in a digital video signal storage device, such as a large capacity magnetic disc file, or it is converted to analog video tape, or converted to motion picture film.

It is preferred to replace the icons used for editing with similar coded icons useful in distributing the motion pictures electronically using the methods described above.

The foregoing and other objects and advantages of the invention are set forth in or will be apparent from the following descriptions and drawings.

DISTRIBUTION SYSTEM

Figure 1:
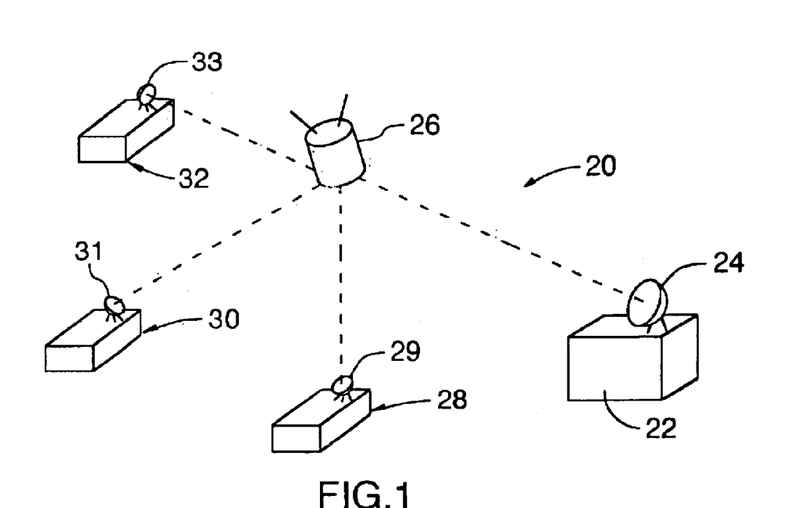
FIG. 1 is a schematic perspective view of a motion picture distribution system constructed in accordance with the present invention.

FIG. 1 shows a motion picture distribution system 20 constructed in accordance with the present invention.

The system 20 includes at least one uplink facility 22 with a dish antenna 24 which transmits encrypted video signals in digital form to a geosynchronous communications satellite 26 positioned in a relatively stationary position over a selected spot on the earth. The satellite 26 has a plurality of transponders each of which can broadcast a separate signal to be received by ground stations.

The system 20 includes a plurality of receiving locations or theaters 28, 30 and 32, each having at least one dish receiving antenna 29, 31 or 33 for receiving video signals from the satellite 26.

Figure 2:
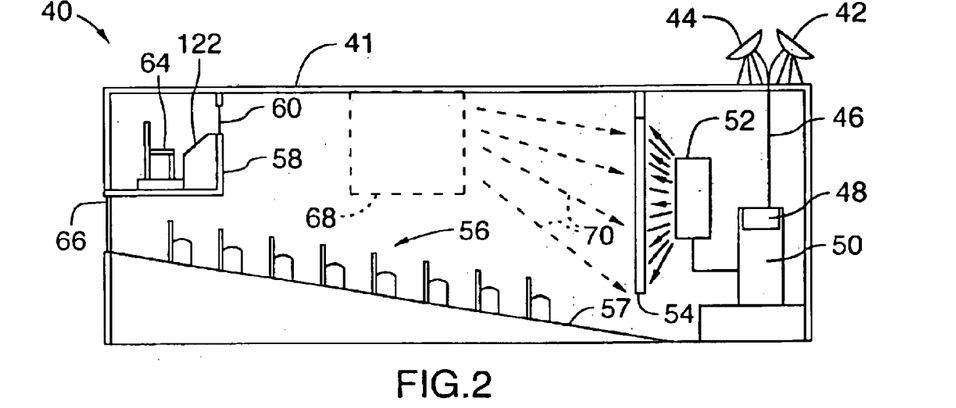
FIG. 2 is a schematic side elevation view of a motion picture theater in which a motion picture distributed by means of the system shown in FIG. 1 is displayed to an audience.

FIG. 2 shows a theater 40 in which motion pictures transmitted by satellite are displayed. Two dish-shaped receiving antennas 42 and 44 are mounted on the roof 41 of the theater. Multiple antennas are provided in order to enable the simultaneous receipt of signals from different satellites located at various positions above the earth.

Signals received from satellites are fed to a controller and icon decoding unit 48 and a video signal storage unit 50, such as a magnetic disc file with relatively large storage capacity.

Because the digital video signals contain very substantial amounts of information due to the need for high-resolution theater displays, the storage capacity of the unit 50 may have to be in excess of one terabyte; that is, in excess of one million megabytes.

The theater 40 has rows of seats 56 secured to a sloping floor 57, a front door 66, and a conventional projectionist's booth 58.

A projection television system 52 is provided. Preferably, it is of a conventional three-tube rear-projection type which projects picture images onto the rear of a screen 54 which displays the pictures on the front surface of the screen where they can be seen by patrons of the theater sitting in the seats 56.

Control of the display of the motion picture is provided from the a projectionist's booth 58, which has a window 60, a control panel 122 and a seat 64 for the operator.

Alternatively, a front projection TV system 68 can be used. Preferably, it is hung from the ceiling of the theater and projects images indicated at 70 onto the front of the projection screen 54.

Other types of projection TV systems can be used to display the pictures to an audience. Flat panel and other equivalent display technology also can be used.

Figure 3:
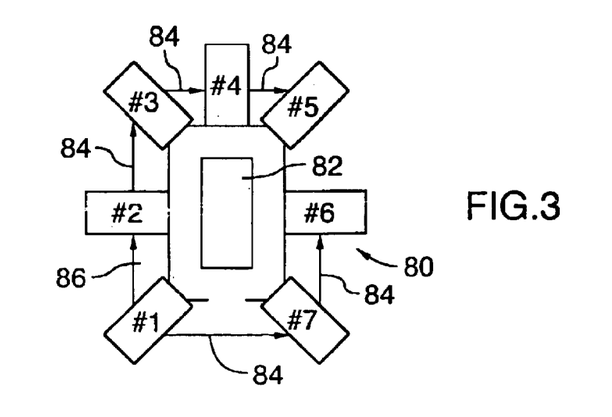
FIG. 3 is a schematic top plan view of a motion picture complex with a plurality of separate theaters used to display pictures distributed by means of the system shown in FIG. 1.

FIG. 3 is a top plan view of a typical multiplex theater complex 80 having a central building with seven separate theaters extending outwardly radially from the center of the complex. These theaters are labeled, respectively, #1, #2, #3, #4, #5, #6, and #7.

A single antenna group and a single storage facility 86 are provided for storing motion picture video images for the entire complex, and the video signals are conveyed by fiber-optic cables 84 to the individual theaters from the storage facility. A concession area for the complex is shown at 82. The transmission of signals from a single receiving and storage facility to nearby display sites such as the theaters in the complex 80 can save on equipment costs, if the distances the signals must travel to the nearby display sites is not too great.

Figure 4:
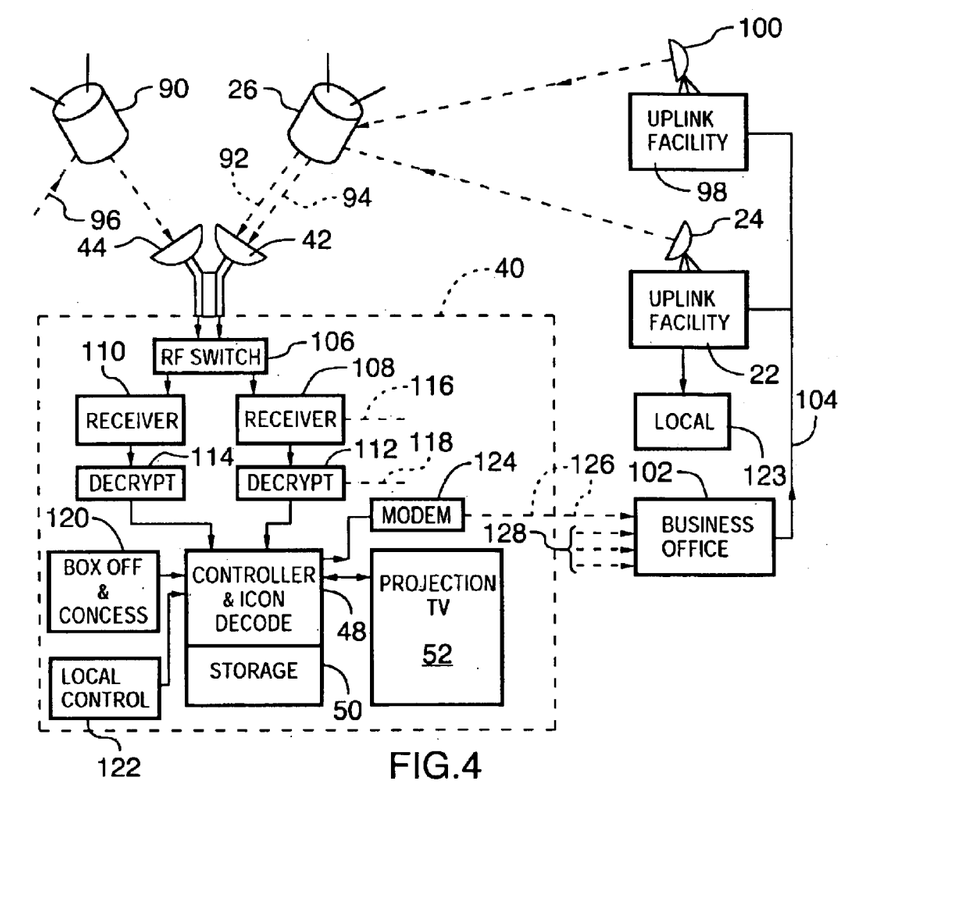
FIG. 4 is a schematic, partially perspective view of another version of the distribution system illustrated in FIGS. 1 and 2.

FIG. 4 illustrates the electrical equipment of the distribution system 20 shown in FIG. 1 in somewhat greater detail, and with some variations.

Two separate uplink facilities 22 and 98 are shown. Each has a transmitting antenna dish 24 or 100 for beaming video signals up to the satellite 26.

Each of the antennas 42 and 44 can receive multiple signals such as those indicated at 92 and 94 simultaneously from different transponders in the satellite 26.

The antenna dish 44 is aimed in a direction opposite to that in which the dish 42 is aimed so as to receive signals from another satellite 90, which receives uplinked video signals from another uplink facility, as indicated at 96.

The signals received by the dish antennas 42 and 44 are delivered to an RF switch 106 which conducts the signals to one of two receivers 108 and 110 which receives signals from one of the transponders in the satellite and sends it to a decryption unit 112 or 114, which decrypts the encrypted signals received from the satellites. The decrypted signals are sent to the controller and icon decoding unit 48. That unit then stores the motion picture signals in the storage unit 50.

Additional receivers and decryption units can be provided to enable the receipt of additional signals.

If the business arrangement between the distributor and the display entity require it, the operators at the receiving location keep track of box office and concession stand receipts during the display of each motion picture. This information is input by means of an input device 122 such as a personal computer to the controller 48. That information, together with the information regarding the identity, times of play, etc. of the motion pictures, is transmitted periodically by means of a modem 124 over telephone lines 126 to a remote business office 102 of the distributor or other entity entitled to receive the information.

Similar reports from other receiving locations are received at the office 102 over other telephone lines 128.

If a local theater is very close to the uplink facility, e.g., the local facility 123, or if land transmission becomes sufficiently inexpensive, then the video signals can be transmitted by cable or other land transmission means to the local theater or other display location.

CODING

The video signals are encoded with code areas or icons which can take a wide variety of forms. A preferred form is shown in FIGS. 7 and 8.

Figure 7:
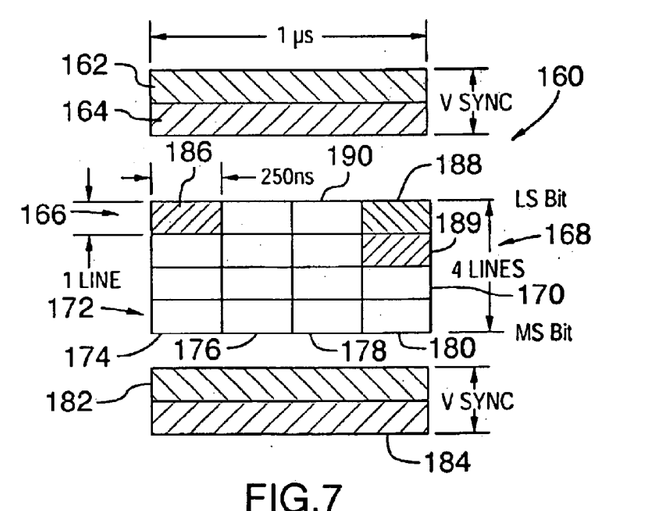
FIG. 7 is a partially schematic exploded view, greatly enlarged, of a coded area or icon constructed in accordance with the present invention.
Figure 8:
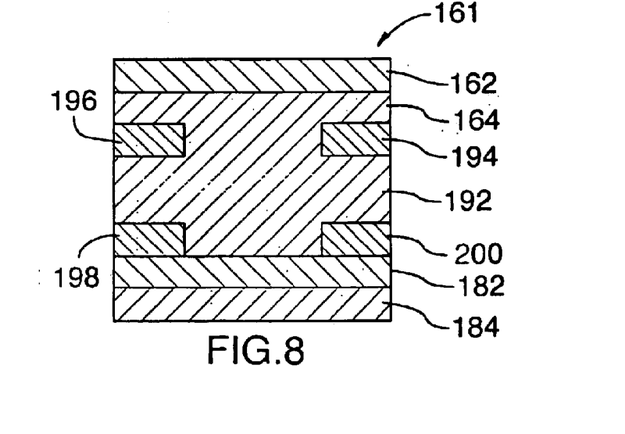
FIG. 8 is an unexploded view of a coded area or icon incorporating code elements such as those shown in FIG. 7.

The code areas or icons 160 and 161 shown in FIGS. 7 and 8 are the same in principle as those disclosed in my U.S. Pat. Nos. 5,450,134 and 5,557,334, the disclosures of which hereby are incorporated herein by reference.

The code areas or icons 160 and 161 are formed in the active picture area of the video signals. That is, the icons are formed in the video picture formed by the signals. In some embodiments of this invention, the icons preferably are located in the margins of the picture so that they are hidden from the view of users of ordinary television receivers because they are outside of the "safe title border" and "safe action border" of the typical television picture. In general, such locations are preferred for use in motion picture distribution, but are less important in editing, where the general public does not see the video pictures.

Referring now to FIG. 7, the icon indicated generally at 160 is divided into three sections; the top section consisting of the contiguous horizontal line segments 162 and 164, a middle section consisting of four horizontal line segments 166, 168, 170 and 172; and a bottom section consisting of horizontal line segments 182 and 184. These sections are shown separated from. one another by a substantial distance for the sake of greater clarity in the drawings. Actually, they usually will be abutting one another as shown in FIG. 8.

As it can be seen in FIG. 7, the icon 160 has a height of eight horizontal lines of the video picture and a width of one microsecond.

The top and bottom sections of the icon are synchronizing signals. Preferably, the upper line segment 162 is white and the lower 164 is black. Similarly, the upper line segment 182 is white and the lower segment is 184 is black.

The synchronizing signals are used to indicate the icon boundaries to the system for detecting the icons. The particular pattern used to create synchronization can be varied, as desired.

The detection of first a white line segment 162 or 182 and then a black line segment 164 or 184 locates the beginning and end of the icon.

The middle section of the icon is divided vertically into four different columns of line segments 174, 176, 178 and 180. Each of the columns is 250 nano seconds wide. This creates sixteen individual code elements such as elements 186 and 188 in the resulting areas.

Figure 11:
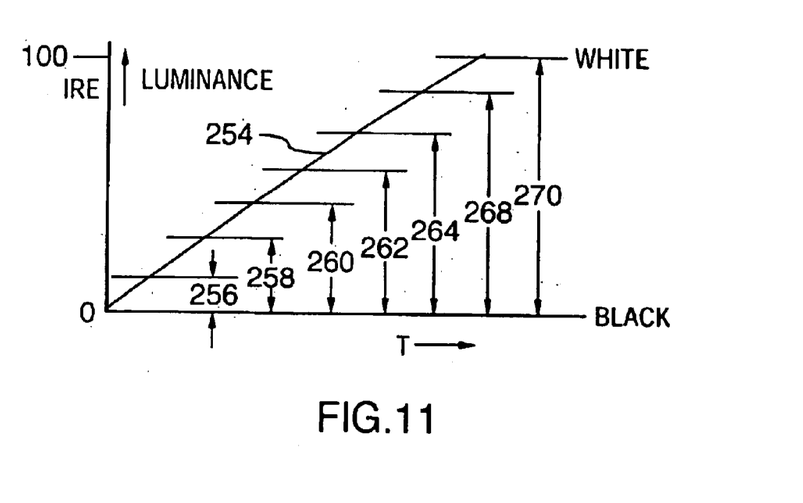
FIG. 11 is a graph illustrating a feature of the invention.

Each of the separate code elements can be given one of eight or more different predetermined luminance levels so as to provide an 8-bit code for each element. For example, the area 188 is white, whereas the area 186 has one of the eight different gray scale levels shown in FIG. 11 of the drawings. These gray scale levels are given the numbers 0, 256, 258, 260, 262, 264, 268 and 270. The code element 189 is all black, which corresponds to zero luminance, and white is at maximum luminance value of 100 IRE. The curve 254 is a straight line variation with time which is used simply to exhibit the different luminance levels that each of the code elements can have.

As it has been noted in the above-identified patents, the code elements can use other color variations as well to even further increase the data storage capacity of the icons. For example, variations in hue or saturation can be used as code variables.

FIG. 8 shows an icon 161 as it might appear using nothing but black and white for the code elements. The area 192 of the icon is entirely black, whereas the areas 194, 196, 198 and 200 are white.

CODE AREA LOCATION

Figure 6:
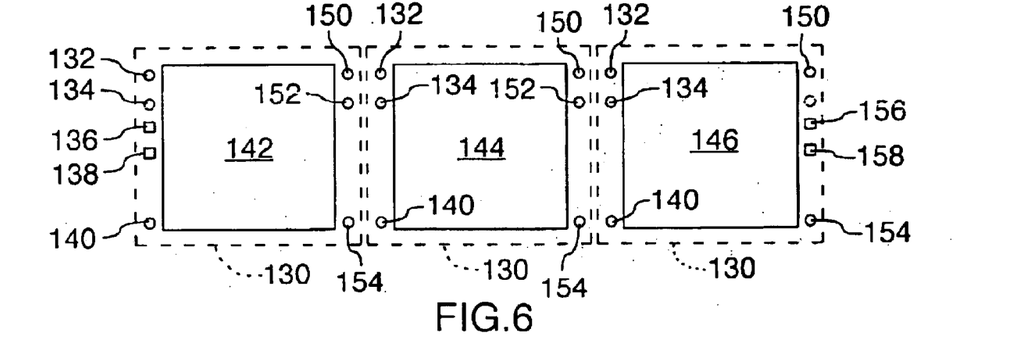
FIG. 6 is a schematic view showing sequential video pictures with coded areas at the edges, as they are produced in accordance with the present invention.

FIG. 6 is a schematic diagram illustrating the desired locations of code areas or icons relative to the active picture areas of pictures which would be seen on video receivers by the viewer. Three different pictures 142, 144 and 146 in a program are shown. The active picture area for each is shown at 130.

Icons 132, 134, 140, 150, 152 and 154 are located in the left and right hand margins outside of the visible area 142 of the first picture, but within the active picture area.

One or more of the icons serves as a "reference" icon which is used as a reference for data-carrying icons, in the manner described in the above-identified patents. Icons 132, 134, 140, 150, 152 and 154 are icons which are recorded for every video frame. These icons carry information which is useful in identifying the motion picture, and other information which applies to every frame of the video program.

Other icons 136 and 138, and 156 and 158, for example, do not appear adjacent every frame, but are used to identify locations at which certain events should occur, or to give information which is useful for editing such as cut points, scene changes, and similar information which does not apply to every frame in the motion picture.

As it has been noted above, although it generally is desirable to locate the icons as shown in FIG. 6 for the purposes of motion picture distribution, because the video version of the film will be viewed in theaters, it is not strictly necessary to so locate the icons for editing purposes, because the images will be viewed only by editing personnel during editing, and can be deleted when editing is complete. However, even during editing it is desirable to locate the icons at the periphery of the images so that they create minimum interference with viewing of the images.

DISTRIBUTION CODING

For the purposes of motion picture distribution, the information which preferably is provided by recording icons in the video signals to be transmitted includes the identification of the motion picture, usually by title as well as a serial number. The serial number is used, preferably, because titles of motion pictures sometimes tend to be confusingly similar or identical with one another, and in order to distinguish different versions of the same film from one another. For example, serial numbers can distinguish between R rated and G rated versions of a motion picture film.

Also included in the icon-encoded information is the identification of authorized receiving locations. This list will be used to enable the authorized receiving locations to decrypt the encrypted video signals.

Typically, motion pictures contain national advertising which the theater is obliged to show along with the feature film. Also, space usually is desired by the local theater operator for local advertising.

The icons are used to identify the insertion locations for local advertising. This is done by marking the location of the start of the insertion, as well as the end point by means of suitably coded icons. These icons can be used by automatic icon readers in the theater to trigger a separate video source to start it in playing the local ad. The icon identifying the end of the insertion area turns off the separate video source and prevents the local ad from encroaching into program material.

Other information encoded in the icons is that which identifies previews of coming attractions which have been selected by the local theater to be displayed. Typically, many previews will be transmitted with the program material, and each theater selects the previews it wants in advance. The icons identify which of the previews is to be displayed by the theater.

The information stored with the help of the icons also can include stop and start signals for the storage device 50. This will start the storage device 50 upon receipt of the coded signals, and stop and turn it off when storage is complete.

It should be understood that, when the program is played in the theater it is automatically re-stored in the storage medium after it has been displayed, until it is erased.

Other information encoded in the icons can include signals erasing the program from the storage device 50 when the theater has displayed the motion picture the authorized number of times, or when the time of authorization is up, thus preventing unauthorized displays of the motion picture.

ENCODING OF VIDEO SIGNALS

For distribution purposes a number of different encoding methods can be used. The "IMPEG" encoding scheme is preferred. In particular, a high quality version of that encoding scheme is preferred so as to give the highest quality motion pictures.

The video signals representing the motion pictures may need enhancement to add resolution to the pictures. This increases the amount of data to be stored in the unit 50.

Compression also is preferred before encryption of the signals to be transmitted. This will reduce the time of transmission and transmission and storage costs.

Also stored by way of icons is a specific code number to be read from the video signals and transmitted with reports sent by modem to the distributor when reporting the displays of the motion picture. This minimizes the chances of fraud in that, if the reports which are sent do not have the special code number, it will be apparent that the information has not been obtained by detecting icons embedded in the motion picture video signals, and that the information is not necessarily valid.

Motion picture distribution by the encryption of the video signals, and their transmission via satellite, rather than by delivering film copies increases security and reduces the likelihood of pirate copies being made. The encryption methods used are like those used in bank transactions, and are secure against all but the most massive code-breaking attempts.

SATELLITE CHARACTERISTICS

Preferably, the satellite should have wide-band high-powered digital transponders such as those now used by the Direct TV Company to enable home owners to use relatively small dish antennas to receive television programs from satellites.

If desired, the icons also can be used to automatically trigger the operation of the modem to transmit information regarding the playing of the motion picture to the distributor, once for every play of the motion picture.

EDITING

Figure 5:
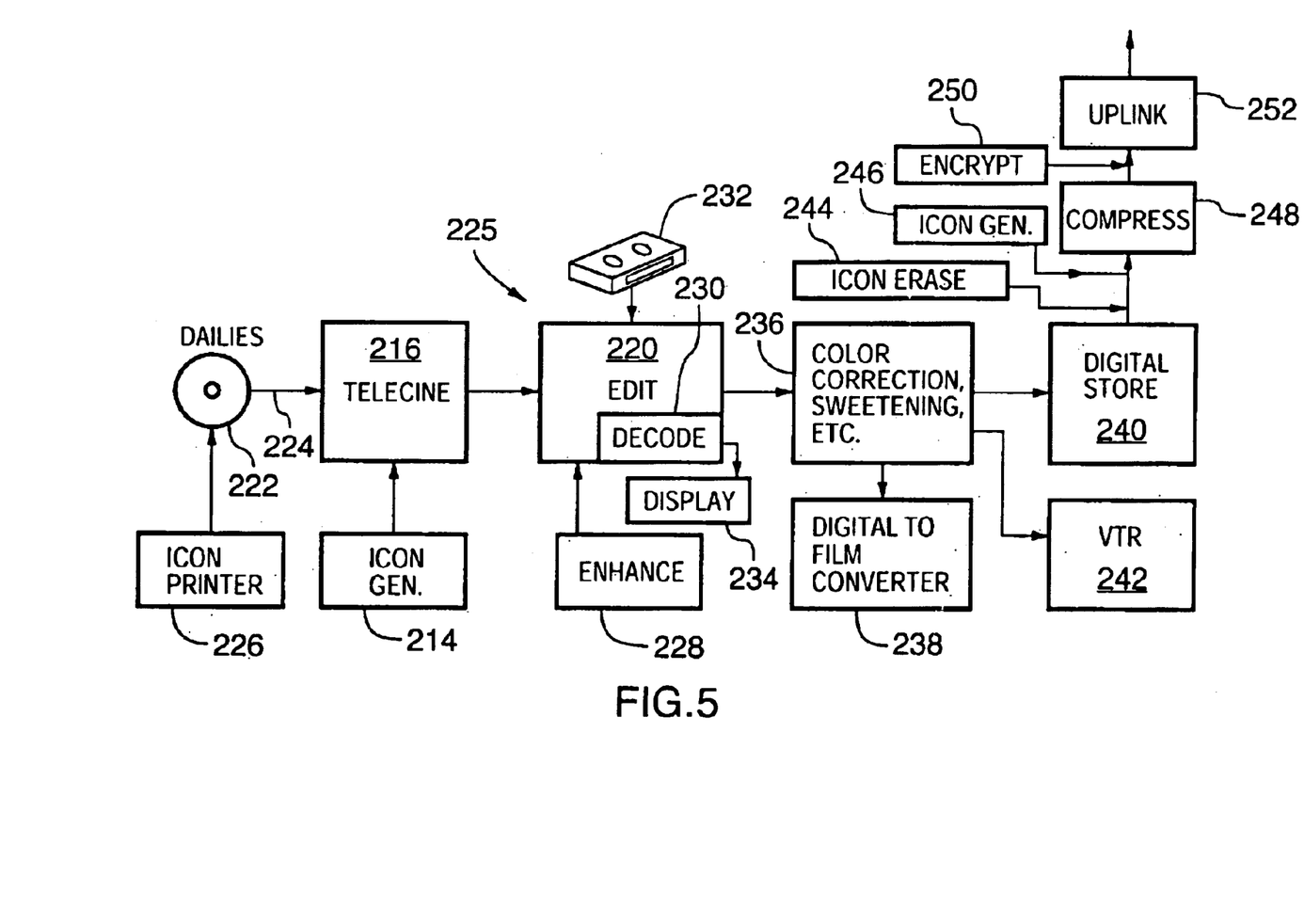
FIG. 5 is a schematic block diagram of a motion picture editing system constructed in accordance with the present invention.

The editing system of the present invention is illustrated schematically in FIG. 5.

As it is well known, motion pictures are filmed, usually on 35 millimeter motion picture film, at various locations. The film reels 222 which are exposed during each day, called "dailies," are sent to a post-production facility 225, as indicated at 224.

At the post production facility, the dailies are converted from film to video signals by means of a film-to-video converter such as a telecine 216. The video signals produced are in digital form.

In accordance with the present invention, icons are inserted into the video signals crated in the telecine by means of an icon generator 214. Such a generator advantageously can be of the type described in my above-identified patents.

The icons which are applied add specific information to the video signals which is useful in editing the film. Such information includes SMPTE time code signals, scene and take numbers, and additional information which typically might be recorded by production personnel on a shoot. Such information can include his or her opinion of which of several "takes" is the best; the location at which the film is shot; the camera number from which the film is shot; and the identification of the crew members involved in the shoot. All or some of this information is useful to film editors in deciding which takes should be selected, where to make cuts and insertions, fade or dissolves and where to insert special effects etc.

The time codes can be converted to icons by a code converter, and the other information can be input to the icon generator by means of a personal computer, for example.

The video signals containing the icons then are sent to an editing system 220, either directly or by way of video cassettes 232. The editing system 220 is conventional, except for its inclusion of a icon decoder 230, which is described in the above-identified patents, and means 234 to display the information derived from the icons. Also, enhancement signals from an enhancement generator 228 are added, if needed to enhance the resolution of the video signals for satellite transmission in the distribution system and method described above, or for other purposes.

The editor or editors use the information provided by the icons in the same way that they use similar information provided in the past.

After the video signals have been edited, the resulting signals are sent to further stations in the post production facility at which sound dubbing, special effects, sound scoring, color correction, etc. are performed.

When the video signals have been completely processed, they are recorded in one of several different ways.

First, the digital signals can be stored in a digital storage unit 240. Alternatively, the digital signals can be converted to analog form and stored on video tape by means of a VTR 242. As a third alternative the signals can be recorded in film form by use of conventional digital video-to-film converter 238.

If it is desired to distribute the motion picture by satellite as described above, the video signals from the digital store 240 are processed in order to prepare them for transmission.

First the icons used for editing purposes are erased by use of an icon erasing circuit 244, which preferably is a programmed keying amplifier programmed to replace each of the icons with video signals matching the surrounding signals so as to give the picture the same appearance as if the icons had never been inserted. Then, new icons needed to control the distribution and play of the motion pictures are added by means of another icon generator 246.

Next, the signals are compressed by means of conventional compression means 248, and are encrypted by use of an encryption device 250 and sent to the uplink facility 252. Then, the motion picture is distributed in the manner described above.

EDGE CODES

In accordance with another feature of the present invention, it is desirable to have available to the editor of the motion picture the edge codes from the motion picture film. In prior editing systems, the edge codes often are not available.

In accordance with the present invention, icons are applied to the motion picture film 202 by means of an icon printer 226, shown in FIG. 5. The printer operates either during the process of making the film and is used by the film maker, or the icons are applied by means of specially adapted 35 millimeter cameras which are used to film the pictures.

Figure 9:
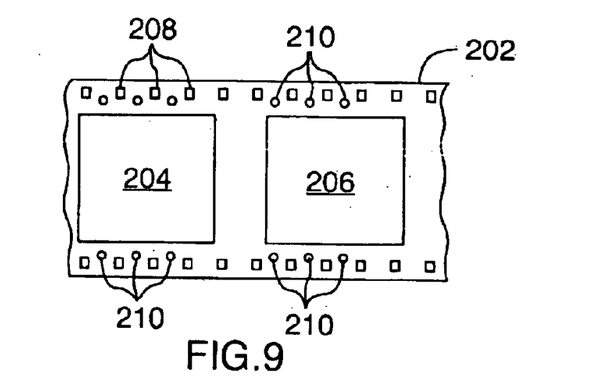
FIG. 9 is a top plan view of a strip of motion picture film modified in accordance with the present invention.

In either case, the icons are recorded as shown in FIG. 9 of the drawings. The icons 210 are recorded in the space between the image areas 204 and 206 and the film's sprocket holes 208.

When the forgoing recording of icons is done, the film needs to be processed by additional equipment before the editing can proceed.

Figure 10:
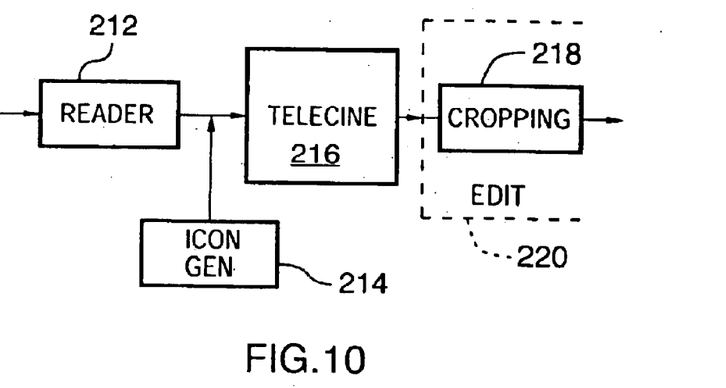
FIG. 10 is a schematic block diagram of a portion of a modification of the editing system shown in FIG. 5.

FIG. 10 shows the additional equipment used for this purpose. An icon reader 212 reads the icons from the motion picture film and sends corresponding signals to the telecine 216. These signals are combined with those from the icon generator 214. All of the icons are inserted into the video signals in the locations such as those indicated in FIG. 6 between successive frames of the video pictures. Then the video signals are sent to a cropping device 218 which eliminates all images extending along the top and bottom edges of the pictures. Editing then proceeds as described above.

In both the distribution and the editing system, the present invention has significant advantages. In the editing system, the icons, because they appear in the active picture area of the video signals instead of the vertical interval, are not easily or frequently destroyed, altered or lost. Thus, the present invention provides more reliable information for editing purposes.

In the motion picture distribution system, because the icons are recorded in the active picture areas of the video signals transmitted, rather than the vertical interval as in the past, the video signals can be distributed much more reliably signals recorded in the vertical interval are subject to alteration or destruction due to compression, encryption, standards conversion, or other processing of the video signals. Such is not the case with the icons. Furthermore, because of encryption of all of the signals in the active picture area, it is extremely difficult for unauthorized persons to gain access to the icons or to the signals themselves, without authorization.

In both the editing and the distribution systems, the amount of information which can be stored in the icons and the data transfer rates is very substantial.

Terms used herein are intended to be interpreted in their broadest sense. For example, "motion pictures" is intended to include not only feature films, but various commercials, previews, short features or other short subjects. Similarly, "editing" is intended to include not only the cutting, positioning and arrangement of various segments of the motion picture, but also sound dubbing, "opticals", special effects, additions, color correction and other post-production processing steps to prepare the motion picture for distribution.

The above description of the invention is intended to be illustrative and not limiting. Various changes or modifications in the embodiments descried may occur to those skilled in the art. These can be made without departing from the spirit or scope of the invention.

What is claimed is:

1. A system for distribution of motion pictures to a plurality of authorized receiving locations, said system comprising transmitting equipment for transmitting motion pictures in electronic signal form from a first location, at least one receiver associated with each of a plurality of receiving locations, at least one motion picture theater for displaying said motion pictures for paid admissions at each of said receiving locations, storage means associated with each of said receiving locations for storing the electronic signals received by said receiver and representing said motion pictures, and display means in each of said theaters for displaying visible motion pictures based upon said electronic signals, said electronic signals including data signals representing data-bearing areas or icons located in the image area of individual frames of said motion pictures, and containing authorization information for enabling said receiver at each of said authorized receiving locations.

2. A system as in claim 1 including detecting means associated with each of said receiving locations for detecting the data signals in said data-bearing icons, and for indicating the detection of said data signals.

3. A system as in claim 1 in which said electronic signals are encrypted, each receiving location has a decryption unit for decrypting said electronic signals, said data-bearing icons include the identification code of each receiving location authorized to receive said motion picture, and a detector at each of said receiving locations for detecting the identification code of that location and enabling said decryption unit.

4. A system for distribution of motion pictures to a plurality of receiving locations, said system comprising transmitting equipment for transmitting motion pictures in electronic signal form from a first location, at least one receiver associated with each of a plurality of receiving locations, storage means associated with each of said receiving locations for storing the electronic signals received by said receiver and representing said motion pictures, and display means associated with each of said receiving locations for displaying visible motion pictures based upon said electronic signals, said electronic signals including data signals representing data-bearing areas or icons located in the image area of individual frames of said motion pictures, including detecting means associated with each of said receiving locations for detecting the data signals in said data-bearing icons, and for indicating the detection of said-data signals, including sending means associated with each of said receiving locations for sending to a remote location information signals representing information taken form said detecting means, in which said information signals identify a motion picture played and the receiving location at which it was played.

5. A system as in claim 1 in which said transmitting equipment includes an uplink facility, a satellite for receiving signals from said uplink facility and sending them to said receiving locations.

6. A system as in claim 1 in which said display means is a projection television display.

7. A system as in claim 1 in which said icons are located in a margin of each frame of said motion picture.

8. A system as in claim 1 in which said transmitting equipment includes means for encoding in said icons information identifying the motion picture being transmitted, and each receiving location authorized to receive the motion picture, and for encrypting said signals before transmission.

9. A system for distribution of motion pictures to a plurality of receiving locations, said system comprising transmitting equipment for transmitting motion pictures in electronic signal form from a first location, at least one receiver associated with each of a plurality of receiving locations, storage means associated with each of said receiving locations for storing the electronic signals received by said receiver and representing said motion pictures, and display means associated with each of said receiving locations for displaying visible motion pictures based upon said electronic signals, said electronic signals including data signals representing data-bearing areas or icons located in the image area of individual frames of said motion pictures, including detecting means associated with each of said receiving locations for detecting the data signals in said data-bearing icons, and for indicating the detection of said data signals, including sending means associated with each of said receiving locations for sending to a remote location information signals representing information taken form said detecting means, in which said information includes a member of the group consisting of: the identify of the motion picture played and the receiving location at which it was played; the number of times the motion picture has been played; when the motion picture was played; box office receipts for the playing of the motion picture; concession receipts during playing of the motion picture; a unique code to identify the information transmitted as to the motion picture from which it came, said remote location being a destination authorized to receive commercial information from said receiving locations.

10. A method of distributing motion pictures to paid admission motion picture theaters at a plurality of remote receiving locations; said method comprising the steps of:

(a) sending from a first station electronic signals representing motion pictures with electronic areas in the image-bearing portions of said motion pictures, said areas bearing information enabling selecting ones of said theaters to receive said signals;

(b) reading said information from said areas to enable receiving said electronic signals at each of said selected ones of said receiving locations;

(c) storing the signals receiving in storage means associated with each of said selected receiving locations;

(d) displaying in said theater at each of said selected receiving locations motion pictures corresponding to said signals.

11. A method as in claim 10 including the step of transmitting the information read from said areas to a further location remote from said receiving locations, and utilizing said information at said further location.

12. A method of distributing motion pictures to receiving locations; said method comprising the steps of:

(a) sending from a first station electronic signals representing motion pictures with electronic information bearing areas in the image-bearing portions of said motion pictures;

(b) receiving said electronic signals at each of a plurality of receiving locations remote from said first station;

(c) storing the signals receiving in storage means associated with each of said receiving locations;

(d) displaying at each of said receiving locations motion pictures corresponding to said signals, and reading the information from said information bearing areas or icons, including the step of transmitting the information read from said icons to a further location remote from said receiving locations, and utilizing said information at said further location, in which said information includes the identify of the motion picture played and the identity of the receiving location at which the picture is displayed.

13. A method as in claim 10 in which said information includes the identity of the motion picture in which said areas are located.

14. A method as in claim 15 in which the sending step comprises uplinking said electronic signals to a satellite and broadcasting said signals to said receiving locations from said satellite, including encrypting said signals before sending them, and detecting information stored in said areas to enable decryption means at those selected receiving locations authorized to receive said signals to decrypt said signals.

15. A method as in claim 10 in which the sending step comprises encrypting and uplinking said signals to a satellite, and said receiving step includes broadcasting said signals from said satellite to a receiving antenna at each of said receiving locations.

16. A method as in claim 10 in which said displaying step includes sending said signals to a projection TV system with a screen in one of said theaters for displaying said motion pictures.

17. A method as in claim 10 in which said signals are digital, said sending step including the step of compressing and encrypting said signals and uplinking them to a satellite.

18. A method of distributing motion pictures to receiving locations; said method comprising the steps of:

(a) sending from a first station electronic signals representing motion pictures with electronic information bearing areas in the image-bearing portions of said motion pictures;

(b) receiving said electronic signals at each of a plurality of receiving locations remote from said first station;

(c) storing the signals receiving in storage means associated with each of said receiving locations;

(d) displaying at each of said receiving locations motion pictures corresponding to said signals, and reading the information from said information bearing areas or icons, including the step of transmitting the information read from said icons to a further location remote from said receiving locations, and utilizing said information at said further location, in which said information includes the identity of the motion picture in which said areas are located, in which said information is selected from the group consisting of the number of time and the dates each location is authorized to display the motion picture; stop and start signals for the storage means at the receiving location; information as to when to erase a motion picture from storage; local insertion location information for previews and/or local advertising; identification of the previews selected for display at each receiving location; and a code number to uniquely identify reports of plays and other commercial activities at the receiving location.

19. A method as in claim 11 in which the information transmitted to said further location includes at least one member selected from the group consisting of; the identity of the motion picture played and the receiving location at which it was played; the number of times the motion picture has been played; when the motion picture was played; box office receipts for the playing of the motion picture; concession receipts during playing of the motion picture; and a unique code to identify the information transmitted as to the motion picture from which it came.

* * * * *